US012586256B2

(12) United States Patent
Suzuki et al.

(10) Patent No.: US 12,586,256 B2
(45) Date of Patent: Mar. 24, 2026

(54) DATA PROCESSING METHOD AND DATA PROCESSING SYSTEM

(71) Applicant: Hitachi, Ltd., Tokyo (JP)

(72) Inventors: Akifumi Suzuki, Tokyo (JP); Hiroaki Akutsu, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 282 days.

(21) Appl. No.: 18/373,559

(22) Filed: Sep. 27, 2023

(65) Prior Publication Data

US 2024/0221233 A1 Jul. 4, 2024

(30) Foreign Application Priority Data

Dec. 28, 2022 (JP) ................................. 2022-212266

(51) Int. Cl.
*G06T 9/20* (2006.01)
*G06T 9/00* (2006.01)

(52) U.S. Cl.
CPC ................ *G06T 9/20* (2013.01); *G06T 9/002* (2013.01)

(58) Field of Classification Search
CPC .................................. G06T 9/20; G06T 9/002
See application file for complete search history.

(56) References Cited

U.S. PATENT DOCUMENTS

| | | | |
|---|---|---|---|
| 2022/0210317 A1 | 6/2022 | Takatsuka et al. | |
| 2022/0269652 A1 | 8/2022 | Suzuki et al. | |
| 2024/0078411 A1* | 3/2024 | Beye ...................... | G06N 3/045 |

FOREIGN PATENT DOCUMENTS

| | | |
|---|---|---|
| JP | 2020-205482 A | 12/2020 |
| JP | 2022-127884 A | 9/2022 |

OTHER PUBLICATIONS

Japanese Office Action received in corresponding Japanese Application No. 2022-212266 dated Jun. 3, 2025.
Johannes Balle, "End-To-End Optimized Image Compression", International Conference on Learning Representations, 2017.

* cited by examiner

*Primary Examiner* — Abhishek Sarma
(74) *Attorney, Agent, or Firm* — MATTINGLY & MALUR, PC

(57) ABSTRACT

In a data processing method executed by a data processing system that performs compression and/or decompression of image data, a tensor shape representing compression target data is obtained, compression processing is performed using data having an input shape fixed for each shape of the compression target data as input, and an input shape fixed compressor for outputting compressed data is generated. Then, the data processing system performs compression processing of compression target data using the generated input shape fixed compressor to generate compressed data.

14 Claims, 17 Drawing Sheets

FIG. 4

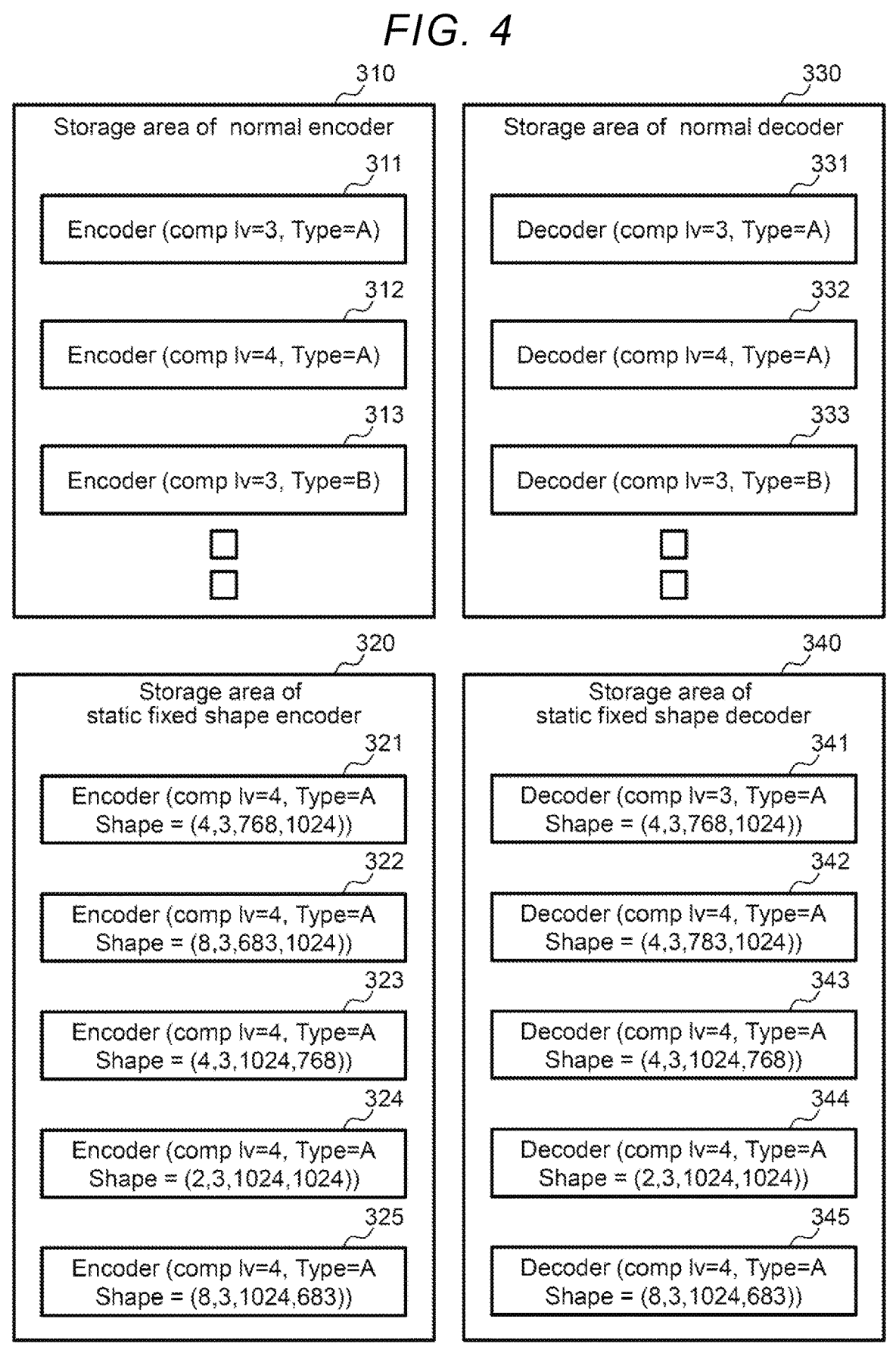

310
Storage area of normal encoder

311
Encoder (comp lv=3, Type=A)

312
Encoder (comp lv=4, Type=A)

313
Encoder (comp lv=3, Type=B)

330
Storage area of normal decoder

331
Decoder (comp lv=3, Type=A)

332
Decoder (comp lv=4, Type=A)

333
Decoder (comp lv=3, Type=B)

320
Storage area of static fixed shape encoder

321
Encoder (comp lv=4, Type=A
Shape = (4,3,768,1024))

322
Encoder (comp lv=4, Type=A
Shape = (8,3,683,1024))

323
Encoder (comp lv=4, Type=A
Shape = (4,3,1024,768))

324
Encoder (comp lv=4, Type=A
Shape = (2,3,1024,1024))

325
Encoder (comp lv=4, Type=A
Shape = (8,3,1024,683))

340
Storage area of static fixed shape decoder

341
Decoder (comp lv=3, Type=A
Shape = (4,3,768,1024))

342
Decoder (comp lv=4, Type=A
Shape = (4,3,783,1024))

343
Decoder (comp lv=4, Type=A
Shape = (4,3,1024,768))

344
Decoder (comp lv=4, Type=A
Shape = (2,3,1024,1024))

345
Decoder (comp lv=4, Type=A
Shape = (8,3,1024,683))

| CompLv (701) | Type (702) | Witdh (703) | Height (704) | Encoder Count (705) | Decoder Count (706) |
|---|---|---|---|---|---|
| 1 | A | 1 | 1 | 0 | 0 |
| 1 | A | 1 | 2 | 0 | 0 |
| : | : | : | : | : | : |
| 1 | A | 1 | 4096 | 0 | 0 |
| 1 | A | 2 | 1 | 0 | 0 |
| 1 | A | 2 | 2 | 0 | 0 |
| : | : | : | : | : | : |
| 3 | A | 683 | 1024 | 32470 | 42578 |
| : | : | : | : | : | : |
| 3 | A | 768 | 1023 | 0 | 0 |
| 3 | A | 768 | 1024 | 52130 | 6687 |
| 3 | A | 768 | 1025 | 0 | 0 |
| : | : | : | : | : | : |
| 3 | A | 768 | 4096 | 0 | 0 |
| 3 | A | 769 | 1 | 0 | 0 |
| : | : | : | : | : | : |

Configuration

Compress Configuration

| | | |
|---|---|---|
| Number of static fixed shape encoder | XXX | 1401 |
| Number of static fixed shape decoder | XXX | 1402 |
| Maximum value of width padding | XXX | 1403 |
| Maximum value of height padding | XXX | 1404 |
| | XXX | 1405 |
| | XXX | 1406 |
| : | : | |

DATA PROCESSING METHOD AND DATA PROCESSING SYSTEM

CROSS-REFERENCE TO RELATED APPLICATION

The present application claims priority from Japanese application JP2022-212266, filed on Dec. 28, 2022, the content of which is hereby incorporated by reference into this application.

BACKGROUND OF THE INVENTION

1. Field of the Invention

The present invention relates to a data processing method and a data processing system in a storage system.

2. Description of Related Art

For example, in Johannes Balle', Valero Laparra, "END-END-OPTIMIZED IMAGE COMPRESSION", ICLR (International Conference on Learning Representations) 2017, a technology for acquiring the ability to reduce the amount of data through training is disclosed to construct processing for reducing the amount of data (hereafter described as "compression processing") with a neural network. It is known that a learning-based compression/decompression device (hereafter described as a "learning-based compressor") constructed with a neural network as such can convert the same amount of data to higher image quality or equivalent image quality with a smaller amount of data compared to compression techniques such as JPEG.

SUMMARY OF THE INVENTION

Compared to image compression of the related art, learning-based compressors have a large calculation amount of neural nets constituting the compressor and decompressor. Thus, when a central processing unit (CPU) is used for learning-based image compression processing, the processing time becomes longer, so the charge amount for resource use increases. Using a graphics processing unit (GPU) for learning-based image compression processing reduces processing time, but because GPU is more expensive than CPU as a computational resource, the charge amount for resource usage still increases. Thus, no matter what computational resources are used in a learning-based compressor, the charge amount for resource usage increases.

Thus, for example, when a learning-based compressor is used to reduce charging costs for storage services provided in public clouds, charges for usage time of servers that perform compression processing may offset the reduction in charges for use of storage services. In other words, there are cases where the reduction effects of data holding costs or data transfer costs due to compression processing cannot be sufficiently obtained.

Therefore, to fully obtain the effect of reducing data holding costs or data transfer costs due to compression processing, it is necessary to shorten the processing time of neural networks, which occupy most of the processing time of compression/decompression processing, or to use computational resources that are lower cost than GPUs.

For example, a library (TensorRT or the like) that optimizes inference processing of a GPU neural network has been disclosed as a method for shortening the processing time of neural networks in GPUs. Libraries for processing neural nets with processing resources dedicated to inference (AWS (registered trademark, similar below) Inferentia) that have lower cost than GPUs have also been disclosed. In such libraries, it is required that the input size to the neural net be fixed for hardware optimization.

Since the neural net used for image compression makes it possible to compress images of various sizes, the neural net is composed of a convolutional arithmetic neural network rather than full connection, and images of any size can be inputted.

However, when using a library where fixing the input size described above is essential, it is necessary to generate a neural net optimized for each image size of the image group to be compressed, time is required for neural net optimization, and there is a problem that the intended cost reduction effect cannot be obtained.

The present invention was made in view of the above background, and an object thereof is to enable compression or decompression processing of image data to be performed in a shorter time or at a lower cost.

Solution to Problem

In one aspect of the present invention, a data processing method executed by a data processing system including a processor that performs compression and/or decompression of image data is characterized in that the processor obtains a tensor shape representing compression target data, generates an input shape fixed compressor that outputs compressed data by executing compression processing with data having a fixed input shape for each shape of the compression target data as input, and generates the compressed data by executing the compression processing on the compression target data using the generated input shape fixed compressor.

Advantageous Effects of Invention

According to one aspect of the present application, compression or decompression processing of image data can be performed in a shorter time or at lower cost.

BRIEF DESCRIPTION OF THE DRAWINGS

FIG. 4 is a schematic diagram of a general-purpose shape compressor/decompressor, an input shape fixed compressor, and an output shape fixed decompressor according to an embodiment;

FIG. 8 is a diagram showing usage frequency management information for a compressor/decompressor according to an embodiment;

FIG. 17 is a diagram showing a user interface screen according to an embodiment.

DESCRIPTION OF EMBODIMENTS

Figure 1:
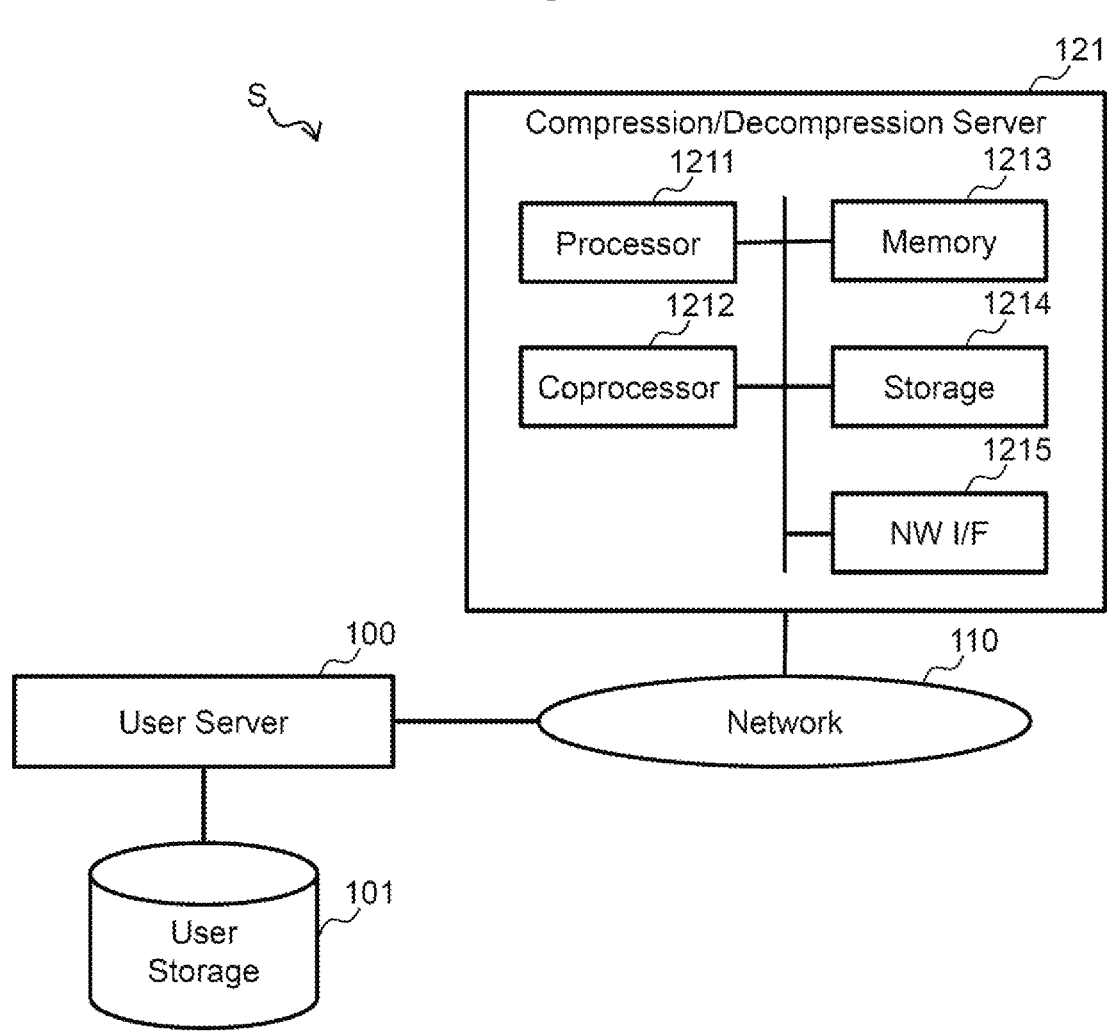
FIG. 1 is a configuration diagram of a system according to an embodiment.

Hereafter, embodiments relating to the disclosure of the present application are described with reference to the drawings. The embodiments are examples for describing the present application including the drawings. In the embodiment, omissions and simplifications have been made as appropriate to clarify the description. Unless otherwise limited, the components of an embodiment may be singular or plural. A form combining one embodiment with another embodiment is also included in the embodiment according to the present application.

The same or similar components are given the same reference numerals, and in the later embodiments and examples, descriptions may be omitted, or only descriptions focusing on differences may be given. When there are a plurality of components that are the same or similar, there are cases where the description is made with different subscripts attached to the same reference numeral. If it is not necessary to distinguish between the plurality of components, the description may be made with the subscripts omitted. The number of each component may be singular or plural unless otherwise specified.

In embodiments, the processing performed by executing a program may be described. A computer performs the processing specified in a program by a processor (for example, a central processing unit (CPU), a graphics processing unit (GPU)), while using a memory of a main storage device, or the like. Therefore, a subject of the processing performed by executing the program may be a processor. The processor executes a program to implement a function unit that performs processing.

Similarly, a subject of the processing performed by executing the program may be a controller, a device, a system, a computer, or a node including a processor. A subject of processing performed by executing a program may be any computation unit, and may include a dedicated circuit for performing specific processing. A dedicated circuit is, for example, a field programmable gate array (FPGA), an application specific integrated circuit (ASIC), or the like.

The program may be installed on the computer from a program source. The program source may be, for example, a program distribution server or a computer-readable non-transitory storage medium. If the program source is a program distribution server, the program distribution server may include a processor and a storage resource (storage) to store the program to be distributed, and the processor of the program distribution server may distribute the program to be distributed to other computers. In an embodiment, two or more programs may be implemented as one program, or one program may be implemented as two or more programs.

The term "size" in an embodiment indicates not the amount of data, but the shape of a data array. For example, in the case of an image, the shape of a 4-dimensional tensor (for example, the number of images, color information (3 in the case of color images), vertical length, horizontal length) is described as size.

(1-1) System Configuration

FIG. 1 is a configuration diagram of a system S in an embodiment. The system S is an example of a system to which an embodiment is applied. The system S is configured to include a user server 100, a user storage 101, and a compression/decompression server 121. The compression/decompression server 121 is an example of a data processing system. The user storage 101 stores images. The user server 100 obtains images stored in the user storage 101 and performs compression/decompression. The compression/decompression server 121 is connected to the user server 100 via a network 110.

The user server 100, the user storage 101, and the compression/decompression server 121 may be a physical server or physical storage operating in an on-premises environment, or an instance (virtual server or virtual storage) on a public cloud service.

The user server 100 is a server that mounts a volume provided by the user storage 101 and is used as a secondary storage area. In the present embodiment, the user server 100 is a general server provided with a CPU, memory, network interface, and the like. The user server 100 transfers a compression/decompression request to the compression/decompression server 121 via the network 110. The user server 100 transfers images to be compressed or compressed data to be decompressed to the compression/decompression server 121 via the network 110.

Figure 2:
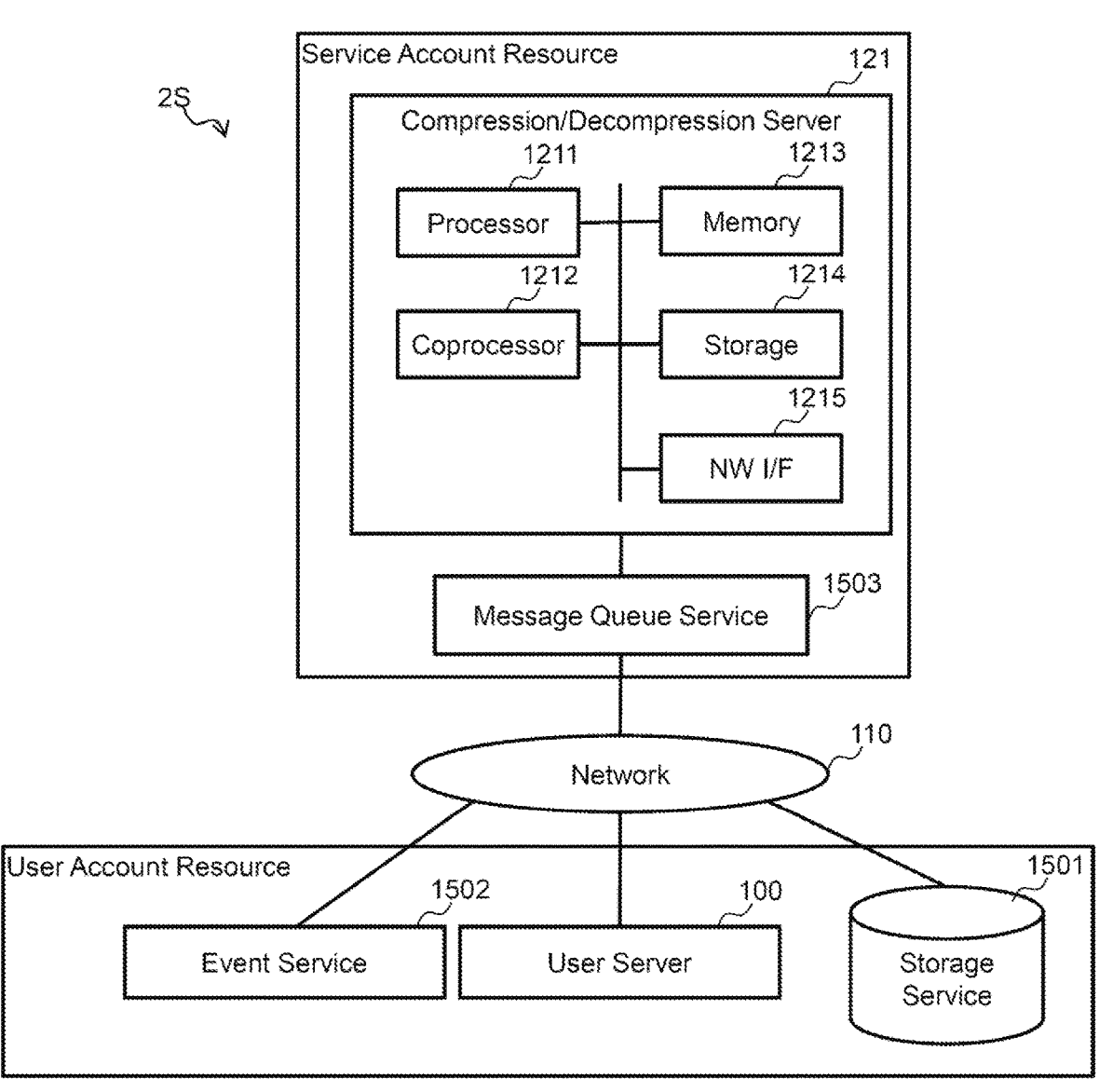
FIG. 2 is a diagram showing a modification of the system configuration.

The system S is not limited to the configuration in FIG. 1. FIG. 2 is a diagram showing a modification of the system configuration. For example, a system 2S shown in FIG. 2 is all disclosed on a public cloud service, and is divided into user-side account resources in the public cloud service (resources for which the user pays the public cloud service provider for use) and compression service-side account resources (resources for which the provider of the compression service pays the public cloud service provider for use).

The user may be configured to record a compression/decompression request as a message in a message service 1503, which is a resource of the compression service-side account, via the network 110. The compression/decompression server 121 regularly polls the message service 1503, and may obtain compression target images or compressed data to be decompressed stored in a storage service 1501. A completion response of the compression/decompression request notified as a message of the message service 1503 may be sent as an asynchronous event by the compression/decompression server to an event service 1502 in FIG. 2 to trigger the start of other processing, and need not necessarily return to the user server.

The network 110 is a network capable of transmitting and receiving various types of data, and may be a public network such as the Internet or a closed area network within a public cloud. The network 110 is not limited to an IP communication network and may be a network connecting the user server 100 to the compression/decompression server 121 according to standards such as PCI-Express.

The compression/decompression server 121 is a server that operates a program to which the present embodiment is applied. The compression/decompression server 121 includes a processor 1211, a coprocessor 1212, a memory 1213, a storage 1214, and a network I/F 1215. The processor 1211 cooperates with the memory 1213 to execute processing on the compression/decompression server 121. The coprocessor 1212 performs specific processing instead of the processor 1211 under the control of the processor 1211. The storage 1214 is a secondary storage device that manages various information used execute to processing by the compression/decompression server 121. The network I/F 1215 is a device for the compression/decompression server 121 to communicate with an external device.

The compression/decompression server 121 performs various compression/decompression processing based on a compression/decompression request from the user server 100. The compression/decompression server 121 is equipped with CPU or GPU which process neural networks or hardware dedicated to neural network processing (AWS Inferentia, Intel (registered trademark) Neural Compute Stick, or the like). The CPU is an example of the processor 1211. The GPU and the hardware dedicated to neural network processing is an example of the coprocessor 1212.

The compression/decompression server 121 is equipped with a software library that can execute processing more efficiently by fixing the shape of the data array inputted to the neural network when processing a neural net with hardware. Software libraries include, for example, NVIDIA (registered trademark, same below) TensorRT, AWS Neuron SDK, Intel OpenVino, or the like. The compression/decompression server 121 has a function of generating a compressor/decompressor using an input shape fixed neural network from a compressor/decompressor capable of processing general-purpose input shapes using the software libraries.

Note that the "input shape" is the shape of the image subject to compression/decompression processing before compression, and the "output shape" is the shape of the image subject to compression/decompression processing after decompression. Therefore, the "input shape" and the "output shape" are the same.

The compression/decompression server 121 has a function to manage a plurality of generated compressors/decompressors with fixed input shapes. The function of managing the compressor/decompressor is provided by the storage 1214. The compression/decompression server 121 has a function to search for shapes with a high presence ratio and generate an input shape fixed compressor/decompressor based on the search results to efficiently compress/decompress images of each shape with different lengths and widths.

(1-2) Overview of Compressors and Decompressors

Figure 3:
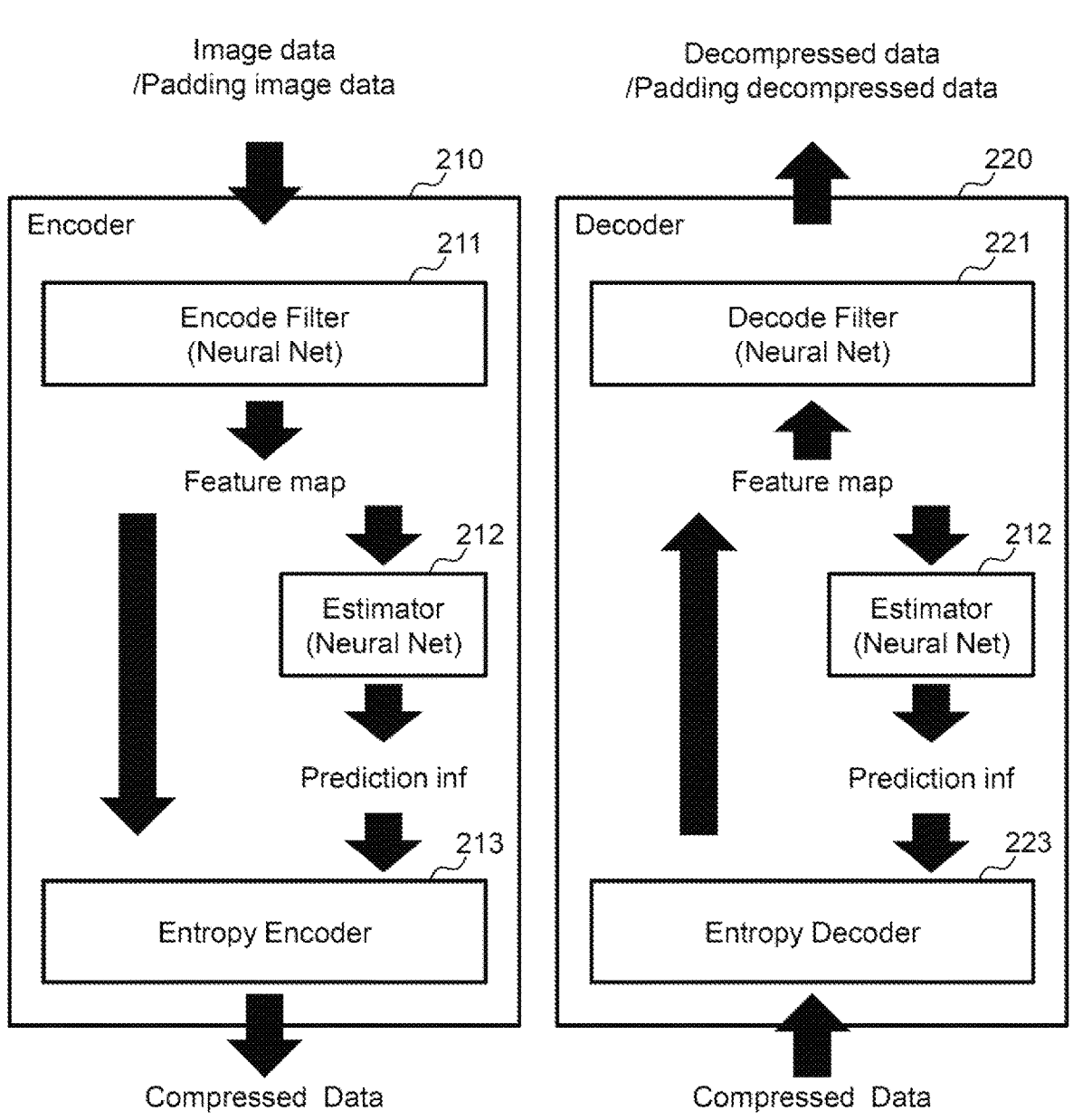
FIG. 3 is a schematic diagram of a compressor/decompressor according to an embodiment.

FIG. 3 is a schematic diagram of a compressor/decompressor according to an embodiment. A compressor 210 according to the present embodiment includes an encoding filter 211, a predictor 212, and an entropy encoder 213.

The encoding filter 211 is composed of a neural network and generates array data called a feature map from input images. The feature map is data that retains many features of the original image while reducing the amount of data, and can obtain a decompressed image extremely close to the original image with a decompressor 220 described later. The encoding filter 211 is generated by training.

The predictor 212 is a predictor configured with a neural network and predicts the value of the feature map from the context of the feature map. For example, in the elements of an array of a feature map, if a value of 1 continues 2 times in the sequence order, there is a high probability that the data in the next array will also have a value of 1. The predictor 212 has a function of predicting such probabilities. The predictor 212 converts the feature map into an efficient data format by inputting the prediction information into the next entropy encoding.

The entropy encoder 213 is a lossless compressor that converts a value to be compressed into a smaller data format using the probability of the value. Algorithms such as asymmetric numeral systems (ANS) and range-coders are known as lossless compressors. In the present embodiment, compressed data obtained by reducing the amount of data in a feature map is generated using prediction information which is an output value of the predictor 212.

In the present embodiment, image data stored in the user storage 101 is compressed by the compressor 210 of the compression/decompression server 121, compressed data is stored in the user storage 101, and original image data is deleted. Thus, the amount of data stored in the user storage 101 is reduced, and various cost reductions are achieved.

The decompressor 220 in the present embodiment is composed of a decoding filter 221, the predictor 212, and an entropy decoder 223. The decoding filter 221 is configured of a neural network and generates a decompressed image from a feature map.

The predictor 212 is the same as the predictor constituting the compressor 210, and the description is omitted. The compressor 210 and the decompressor 220, which share the predictor 212, are paired, and compressed files generated by the compressor 210 using a different predictor 212 cannot be decompressed.

The entropy decoder 223 decompresses the compressed data generated by the entropy encoder 213 and generates a feature map. Here, all feature maps are decomposed by repeating a loop of "a part of the feature map is decompressed from the compressed data, the decompressed partial feature map is inputted to the predictor 212, prediction information for the other part is generated, and part of the feature map is decompressed with partial prediction information".

In the present embodiment, the decompressor 220 performs decompression processing based on a request from the user server 100.

(1-3) General-Purpose Shape Compressors/Decompressors and Management of Input Shape Fixed Compressors/Decompressors FIG. 4 is a schematic diagram of a general-purpose shape compressor/decompressor, an input shape fixed compressor, and an output shape fixed decompressor according to an embodiment. FIG. 4 is a diagram for describing the management of the compressor and decompressor in the present embodiment. In the present embodiment, two types of compressors and decompressors are managed.

The first of the two types is a general-purpose shape compressor/general-purpose shape decompressor, and holds general-purpose shape compressors 311 to 313 capable of compressing images of various general-purpose shapes in a general-purpose shape compressor holding area 310 and a general-purpose shape decompressor holding area 330.

Depending on the type of the compressor/decompressor, "compression level", "type", and the like are different. The "compression level" is a value that relatively defines the amount of data to be reduced, and in the present embodiment, the larger the value of the compression level, the smaller the amount of data when compressed, and the image quality deteriorates further.

The "type" specifies, for example, a priority image quality index. For example, if it is multi scale-structural similarity index measure (MS-SSIM), it shows that MS-SSIM is a type of compressor that reduces the amount of data so that it does not deteriorate.

A learning-based compressor can generate compressors that prioritize various image quality indicators, and can generate image quality indicators that are difficult to influence image analysis results and compressors/decompressors optimized for image quality indicators where there is no sense of incongruity when viewed by humans.

The decompressor is managed as a pair with the compressor, and manages general-purpose shape decompressors 331 to 333 corresponding to general-purpose shape compressors 311 to 313.

The compression/decompression server 121 of the present embodiment holds general-purpose shape compressors/general-purpose shape decompressors of a plurality of compression levels and a plurality of types, and performs compression/decompression processing using the compressor/decompressor in response to a request from a user.

Another type of compressor/decompressor is an input shape fixed compressor/decompressor. The input shape fixed compressor/decompressor is a neural network constituting an encoding filter, decoding filter, and predictor of a general-purpose shape compressor/decompressor and is optimized based on the compressor/decompressor by specializing in data with a specific input shape. Due to the optimization, it is possible to perform the same processing as a general-purpose shape compressor/decompressor, yet it is possible to operate at a higher speed or with cheaper hardware resources.

In an input shape fixed compressor, data is generated for each input shape, and even at the same compression level and the same type, it is held as individual input shape fixed compressors 321 to 325 for each input shape. The input shape fixed compressor collectively processes a plurality of images of the same shape.

For example, the input shape fixed compressor 321 shown in FIG. 4 is a compressor compatible only with input shapes (4, 3, 768, 1024), and is a compressor that collectively processes 4 RGB color images with 3 primary colors of height 768 and width 1024. It is possible to process a plurality of images more efficiently by collectively processing the images. The number of images processed collectively varies depending on the size of the images and the memory of the processing hardware. The compression/decompression server in the present embodiment investigates the total number of images for each image size that can be generated in advance, and generates an input shape fixed compressor and an output shape fixed decompressor with the maximum number of images based on the investigation result.

To simplify the explanation, an example is shown in the embodiment where the number of input shape fixed compressors and decompressors held is five, but the embodiment is not limited thereto. Any number of input shape fixed compressors may be held according to generation time or storage area.

Compressed data compressed by the input shape fixed compressor can be decompressed with a general-purpose shape decompressor if the compressor and the decompressor have the same compression level and type, and there is no need for the hold input shape fixed compressor and decompressor to be paired. Appropriate input shape fixed compressor and output shape fixed decompressor are independently managed according to usage frequency. Details of update processing for the input shape fixed compressor and the output shape fixed decompressor will be described later.

(1-4) Overview of Compression Processing

Figure 5:
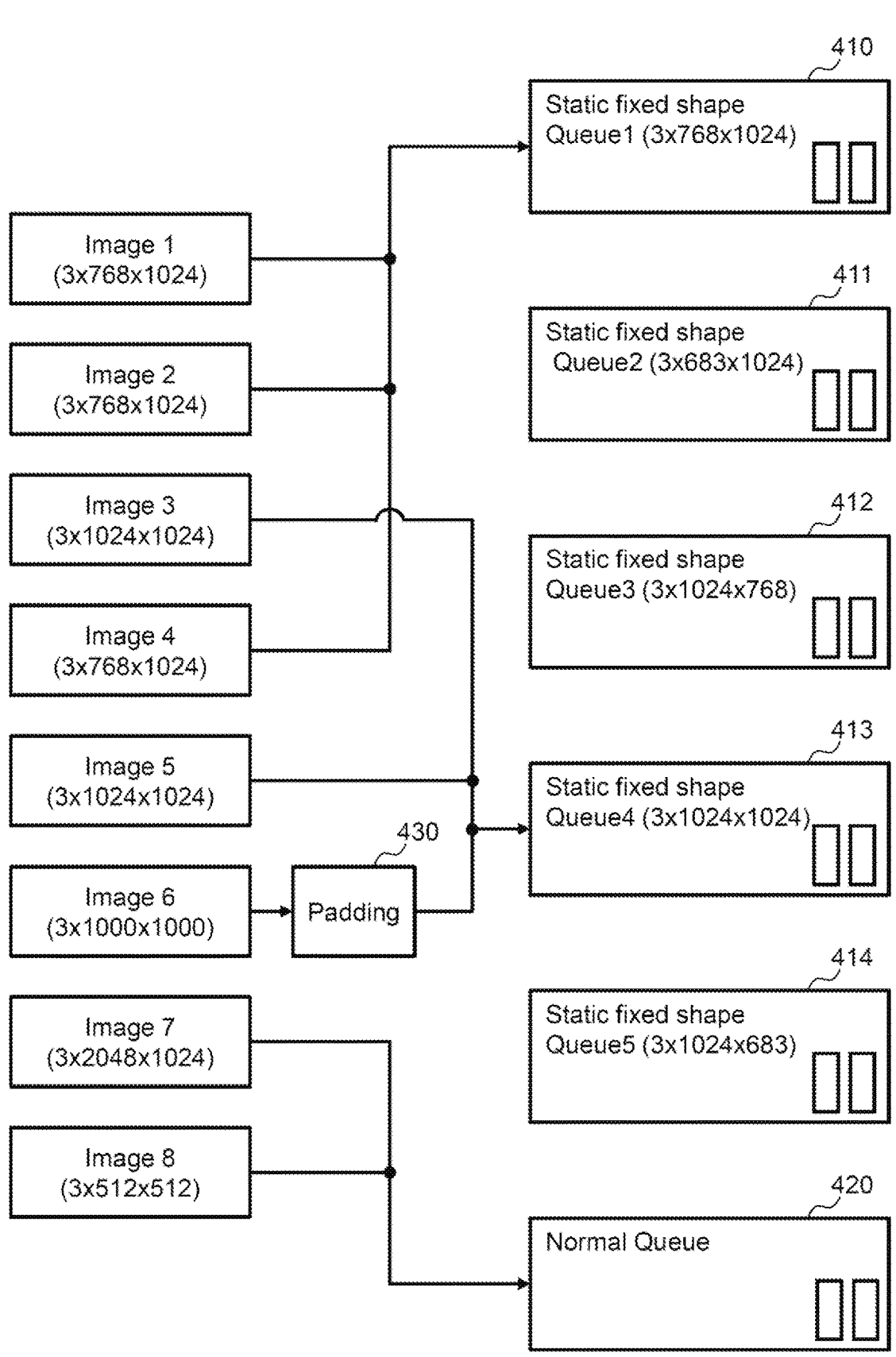
FIG. 5 is a schematic diagram of compression processing according to an embodiment.

FIG. 5 is a schematic diagram of compression processing according to an embodiment. The outline of compression processing is described with reference to FIG. 5. In the present embodiment, five shape fixed compressors are managed, and compression queues 410 to 414 for registering images are provided for each shape fixed compressor. A compression queue 420 for a general-purpose shape compressor is also provided.

Since the shape of images 1, 2, and 4 in FIG. 5 is 3×768×1024 (RGB color image 3, height 768, width 1024), the images 1, 2, and 4 are stored in the compression queue 410 for a 3×768×1024 input shape fixed compressor. Since the shapes of the images 3 and 5 are 3×1024×1024, the images 3 and 5 are stored in the compression queue 413 for an input shape fixed compressor.

The image 6 has a shape of 3×1000×1000. However, in the example in FIG. 5, there is no 3×1000×1000 input shape fixed compressor. 3×1000×1000 is slightly smaller in size than a 3×1024×1024 shape fixed compressor. Therefore, an array of 0 values is padded by padding processing 430 so that the pixels are 1024 in height and 1024 in width, and stored in the compression queue 413 of an input shape fixed compressor as 3×1000×1000-3×1024×1024.

In the present embodiment, if the shape is insufficient only 32 or less in height and 32 or less in width, respectively, from any of the five input shape fixed compressors to be managed, the insufficient pixel 0 values are padded and such that processing is capable by the input shape fixed compressor.

In the present embodiment, the threshold value for determining whether to execute padding is 32, but the embodiment is not limited thereto. The threshold value may be larger or smaller than 32, but the value is a value such that even though the amount of padding increases and the amount of computation increases, processing performance should not deteriorate.

The shapes of images 7 and 8 in FIG. 5 are 3×2048×1024 and 3×512×512, respectively, and there is no corresponding input shape fixed compressor in the example in FIG. 5. Thus, the images 7 and 8 are stored in the compression queue 420 for the general-purpose shape compressor.

As shown in FIG. 5, each image is stored in each compression queue, images are taken from each compression queue by compression processing described later, and compression processing is performed with the associated input shape fixed compressor or general-purpose shape compressor. Here, images stored in the compression queues 410 to 414 of the input shape fixed compressors may be compressed collectively for a predetermined number of images. The input shape fixed compressor associated with each compression queue is updated to an input shape fixed compressor with a larger number of images to be processed collectively in the update processing of the input shape fixed compressor described later.

(1-5) Overview of Decompression Processing

Figure 6:
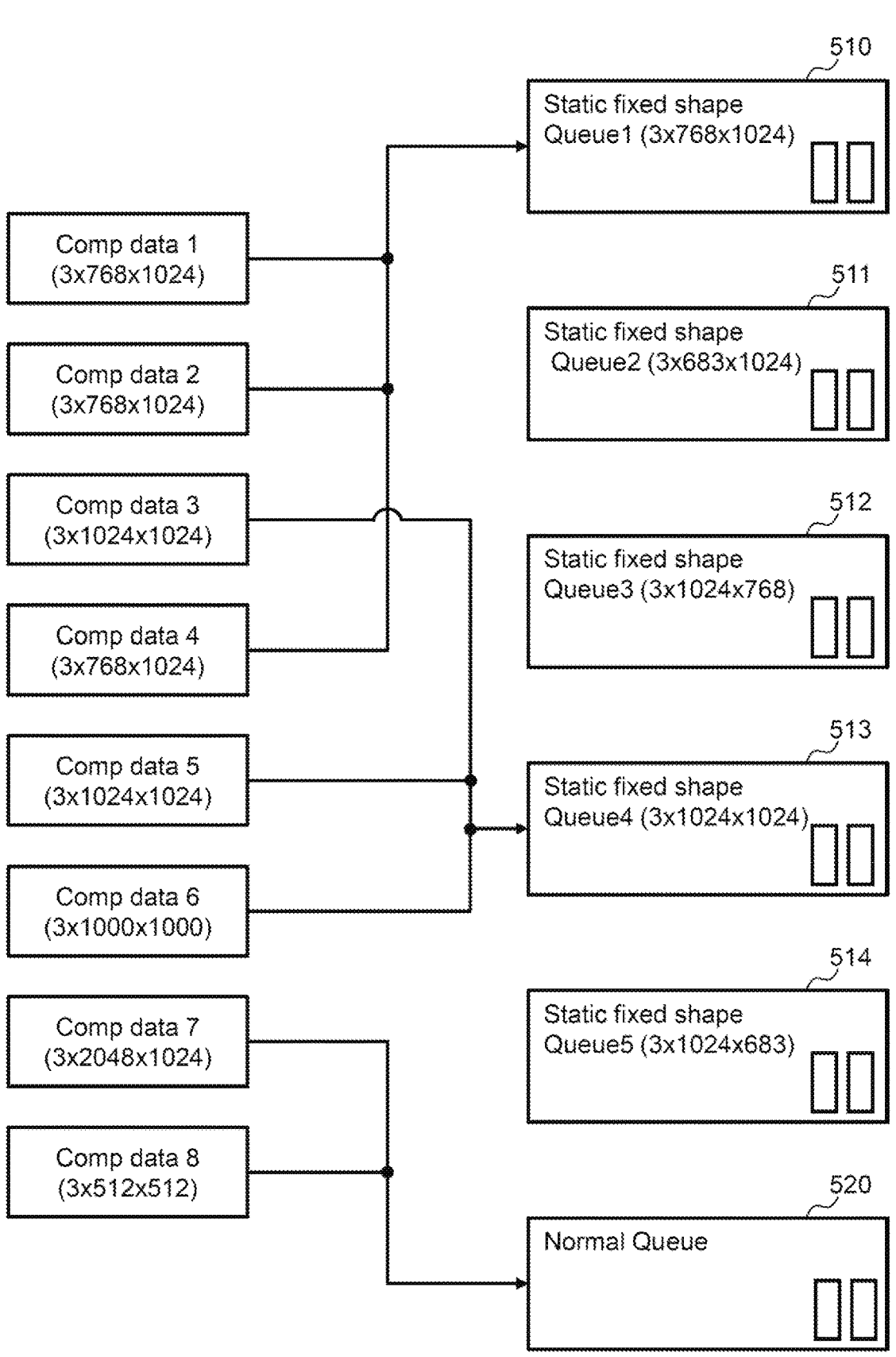
FIG. 6 is a schematic diagram of decompression processing according to an embodiment.

FIG. 6 is a schematic diagram of the decompression processing according to an embodiment. As shown in FIG. 6, the decompression processing is similar to the compression processing in FIG. 5. There are decompression queues 510 to 514 for a plurality of output shape fixed decompressors and a decompression queue 520 for a general-purpose shape decompressor, and compressed images are stored in the decompression queues.

Figure 7:
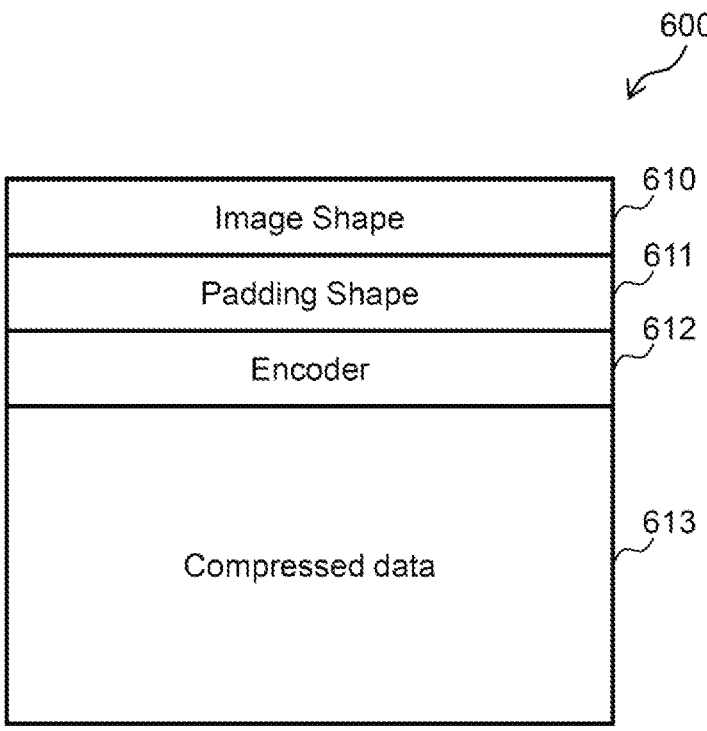
FIG. 7 is a schematic diagram of a compressed file according to an embodiment.

In the image 6 in FIG. 7 compressed by applying padding processing, the shape of the data before compression is 3×1000×1000, but the image is managed as 3×1024×1024 compressed data by 0 value padding. Thus, after being decompressed as compressed data of 3×1024×1024, a pre-compression image shape 610 and a padding shape 611 included in the header of the compressed data described later are referred to, and the padding area included in the decompressed image data is deleted to complete the decompression processing.

(1-6) Compressed File Format

FIG. 7 is a schematic diagram of compression file according to an embodiment. The compressed file of the present embodiment is configured to include at least a pre-compression image shape 610, a padding shape 611, compressor header information 612, and compressed image data 613.

The pre-compression image shape 610 is a field that holds the shape of the image before compression. The value obtained by adding the padding shape 611 to the pre-compression image shape 610 becomes the output shape of the decompressor. Thus, the pre-compression image shape 610 is referred to together with the padding shape 611 when padded image data is stored in a decompression queue. In the present embodiment, compressed data is stored in the decompression queues 510 to 514 of output shape fixed decompressors and the decompression queue 520 of the general-purpose shape decompressor using the output shape of the decompressor.

The padding shape 611 is a field holding the shape of the padding performed during compression. The padding shape 611 is used not only to store compressed data in the decompression queue, but also to remove padding areas from the decompressor output image. The padding shape 611 is configured of four types of information, for example, the amount of padding (number of pixels) in the horizontal direction of the image on the left and right sides centered on the image to be compressed, and the amount of padding (number of pixels) in the vertical direction of the image on the upper and lower sides centered on the image to be compressed.

The compressor header information 612 is a field for storing information on the compressor that executed compression processing. When compressed data is decompressed, the compressor header information 612 is referred to, and decompression processing is performed using a decompressor that is paired with the compressor indicated by the compressor header information 612.

The compressed data 613 is a field for storing binary data obtained by turning an image into a feature map using an encoding filter and compressing the feature map by entropy encoding. A feature map is generated by decompressing compressed data with an entropy decoder during decompression.

(1-7) Compressor/Decompressor Usage Frequency Management Information 700

FIG. 8 is a diagram showing usage frequency management information 700 for a compressor/decompressor according to an embodiment. In the present embodiment, the number of times the compressor and decompressor are used is counted and held for each compression level, compression type, and image input shape (vertical length×horizontal length). For a compressor/decompressor that is regularly used a large number of times, an input shape fixed compressor/decompressor is generated and updated by being replaced with an input shape fixed compressor/decompressor whose usage frequency decreased. The information used in the update processing is usage frequency management information 700 of the compressor/decompressor shown in FIG. 8.

The usage frequency management information 700 is configured to include fields of compression level 701, compression type 702, vertical length 703, horizontal length 704, compressor count 705, and decompressor count 706. Only the compressor count 705 and the decompressor count 706 are fields to be updated, and the other fields store fixed values.

The compressor count 705 is a field that stores the number of times an image of an input shape specified by the vertical length 703 and the horizontal length 704 was compressed using a compressor specified by the compression level 701 and the compression type 702 on the same row. The number of compression times in the present embodiment is counted based on the input shape of the image before padding processing, but is not limited thereto. For example, the input image shape and the input shape considering padding may be counted in independent fields.

In the present embodiment, the value of the compressor count 705 of a certain shape is obtained in the update processing of the input shape fixed compressor described later, and the total value of the compressor count of all shapes within the range of shapes from that shape to −32 vertically and −32 horizontally, which are padding thresholds, is calculated. Then, a shape with a total value in the top 5 is selected from all shapes, and an input shape fixed compressor is generated based on a general-purpose shape compressor specified by the corresponding compression level and compression type.

As described above, the padding threshold is not limited to 32 in height and 32 in width. The padding threshold may be any value. For example, 64 pixels vertically and 128 pixels horizontally may be padded. Here, the values of compressor counts of 64×128=8192 types of shapes are summed to search for the input shape that is used the most times.

The decompressor count 706 is a field that stores the number of times an output image specified by the vertical length 702 and the horizontal length 703 was decompressed using a decompressor specified by the compression level 701 and the compression type 702 on the same row. The value of the decompressor count 706 is counted not by the shape of the image to be decompressed, but by the output shape of a decoding filter including padding. The embodiment is not limited thereto, and the value of the decompressor count 706 may be counted based on the shape after removing the 0 value, for example, in reverse padding processing.

In the embodiment, in the update processing of the output shape fixed decompressor described later, a value of the decompressor count 706 of a certain shape is obtained, a shape with the size of the value in the top 5 is selected, and an output shape fixed decompressor is generated based on a general-purpose shape decompressor specified by the corresponding compression level and compression type.

In the present embodiment, usage frequency management information 700 of the compressor/decompressor is updated after compression processing/decompression processing is performed, but the embodiment is not limited thereto. For example, during compression processing, when a user collectively transmits a plurality of compression requests that each specify an image to be compressed, the following processing may be performed. In other words, the distribution of the shape of the image group before compression processing is investigated, the usage frequency management information 700 for the compressor/decompressor is created, and an input shape fixed compressor is generated based on the usage frequency management information 700.

(1-8) Registration Processing to Compression Queue

Figure 9:
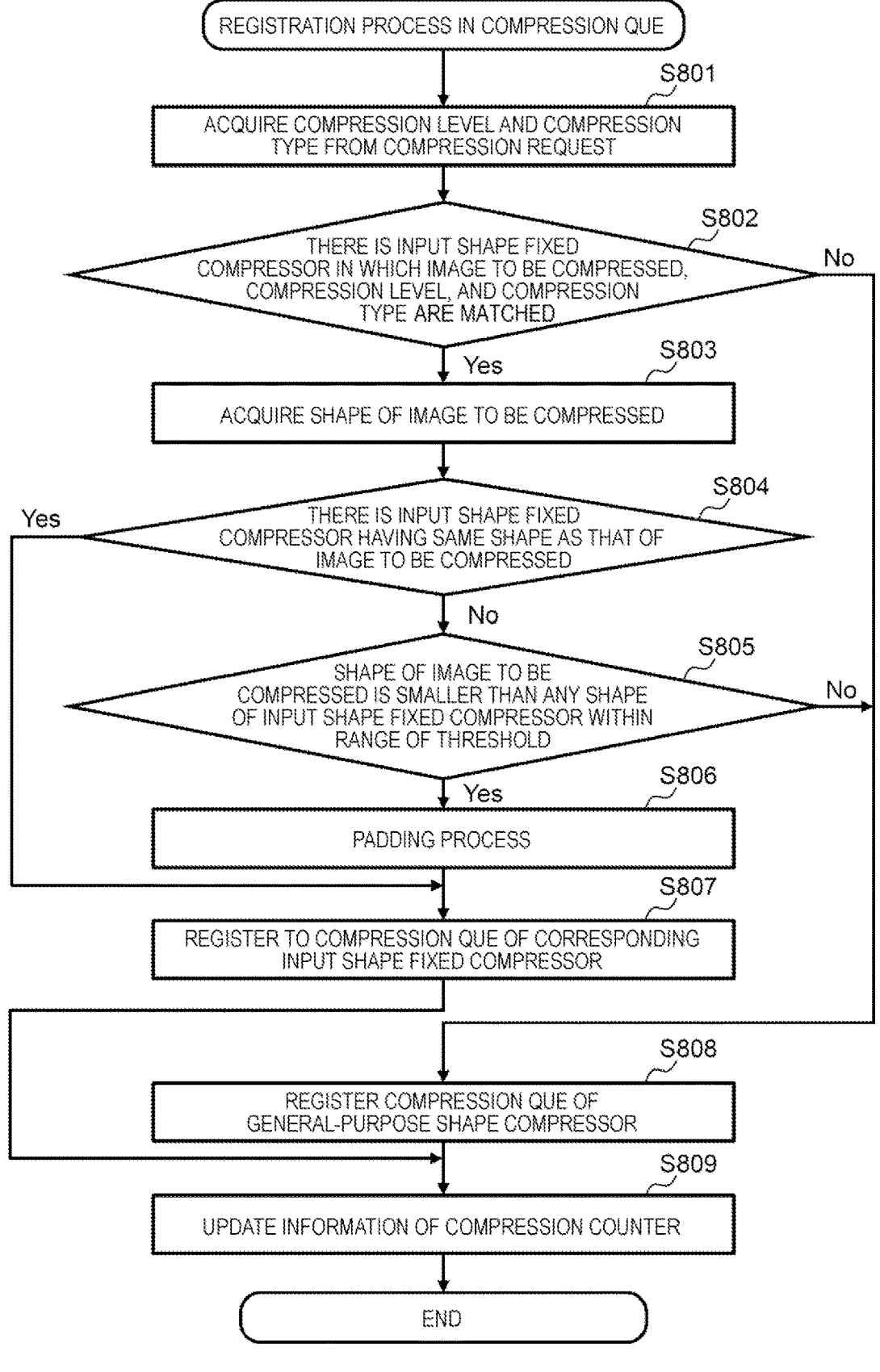
FIG. 9 is a flowchart showing registration processing to a compression queue according to an embodiment.
Figure 10:
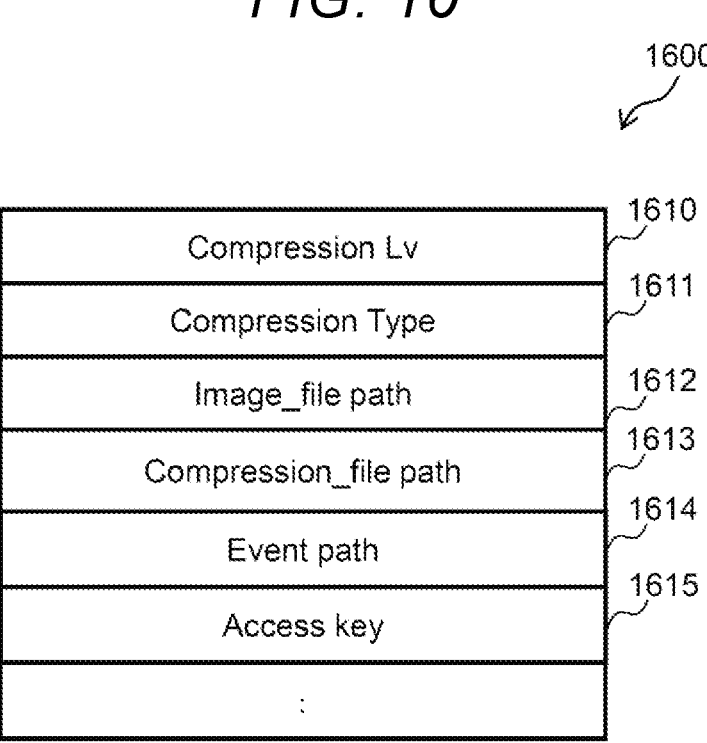
FIG. 10 is a diagram showing a configuration of a compression request according to an embodiment.

FIG. 9 is a flowchart showing registration processing to a compression queue according to an embodiment. The processor 1211 mounted on the compression/decompression server 121 performs registration processing to the compression queue. FIG. 10 is a diagram showing a configuration of a compression request according to an embodiment.

First, in step S801, the processor 1211 obtains a compression level 1610 and a compression type 1611 from the compression request 1600 shown in FIG. 10 received from a user.

The compression request 1600 shown in FIG. 10 includes a file path 1612 in the storage service 1501 for images to be compressed, a file path 1613 in the storage service 1501 for compressed files after image compression, an event path 1614 in the event service 1502 that notifies a completion event after completion of compression processing, and an access key 1615 for the storage service 1501 acquiring the images to be compressed or storing the compressed files after compression, but it is not necessary to include all the information shown in FIG. 10. The information included in the compression request 1600 changes depending on the system configuration.

Next, in step S802, the processor 1211 checks whether there is an input shape fixed compressor that matches the compression level and compression type obtained from the compression request received in step S801 in the input shape fixed compressors currently managed by the compression/decompression server 121. The processor 1211 proceeds processing to step S803 when there is an input shape fixed compressor corresponding to the compression level and compression type obtained from the compression request (Yes in step S802). On the other hand, the processor 1211 proceeds processing to step S808 when there is no input shape fixed compressor corresponding to the compression level and compression type obtained from the compression request (No in step S802).

In step S803, the processor 1211 obtains the shape of the image to be compressed. The shape of the image to be compressed and the input shape may match, but when padding is applied in later processing, the shape of the image to be compressed and the input shape are different.

Next, in step S804, the processor 1211 checks whether there is an input shape fixed compressor having the same input shape as the shape of the image to be compressed obtained in step S801. In the present embodiment, when the input shape of any of the five input shape fixed compressors matches the shape of the image to be compressed obtained in step S803 (Yes in step S804), processing proceeds to step S807. Meanwhile, the processor 1211 proceeds processing to step S805 when the input shapes of all input shape fixed compressors and the shape of the compression target image obtained in step S803 do not match (step S804 No).

In step S805, the processor 1211 checks whether the shape of the image to be compressed obtained in step S803 is a small image in the range of height 32 and width 32, which are threshold values, compared to the input fixed shape of any of the five input shape fixed compressors. The processor 1211 proceeds processing to step S806 in the case of a small image in the range of height 32 and width 32, which are threshold values (Yes in step S805). Meanwhile, the processor 1211 proceeds processing to step S808 when the shape of the image to be compressed obtained in step S803 is an image larger than all five input shape fixed compressors, or an image smaller than the range of 32 vertical and 32 horizontal values, which are threshold values (No in step S805).

In step S806, the processor 1211 performs padding processing on the image to be compressed obtained in step S803. In other words, the processor 1211 performs padding processing on the image to be compressed so that the input shape is equivalent to the input shape of an input shape fixed compressor larger within the threshold value range discovered in step S805.

For example, if the shape of the image to be compressed is 3×1000×1000 (RGB color image 3, 1000 pixels vertically, 1000 pixels horizontally) and the input fixed shape of the input shape fixed compressor is 3×1024×1024, then the processing proceeds as follows. In other words, 0 values are padded into an area of 24 pixels long and 24 pixels wide, and 3×1024×1024 image data is created.

When a plurality of input shape fixed compressors with input shapes larger within the threshold range for the image to be compressed are found in step S805, an input shape fixed compressor with a minimum amount of padding is selected.

In step S807, the processor 1211 registers compression target image data or padded compression target image data in the compression queue of the corresponding input shape fixed compressor. When step S807 is finished, the processor 1211 proceeds processing to step S809.

In step S808, the processor 1211 registers image data to be compressed that cannot be compressed by the input shape fixed compressor into the compression queue of the general-purpose shape compressor. In step S809, the processor 1211 updates the compressor count 705 of the compressor/decompressor usage frequency management information 700 (FIG. 8). In other words, the processor 1211 increments the value of the compressor count 705 corresponding to the compressor specification information received from the user and corresponding to the shape (shape not including padding) of the image to be compressed obtained in step S803.

(1-9) Compression Processing

Figure 11:
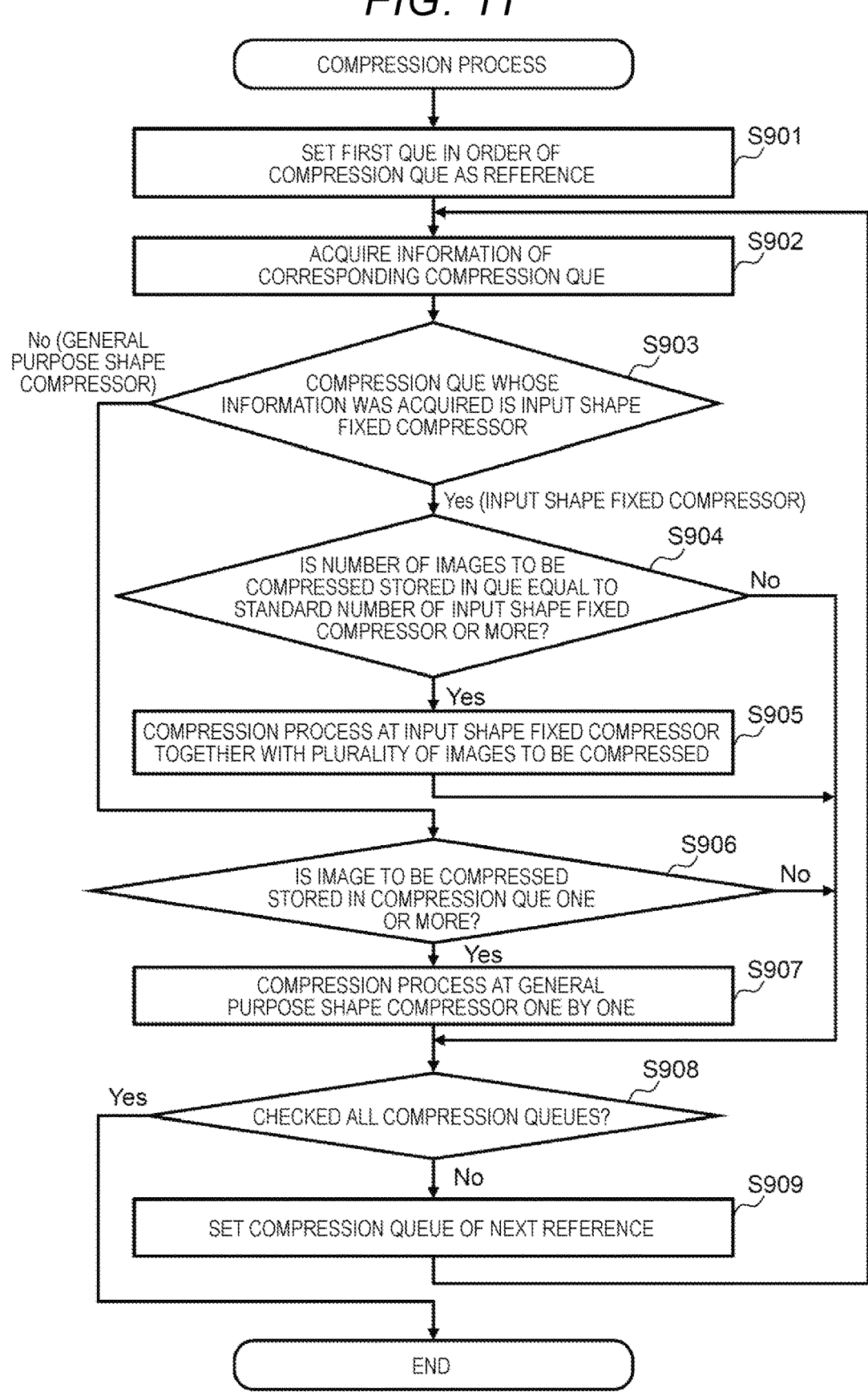
FIG. 11 is a flowchart showing the compression processing according to an embodiment.

FIG. 11 is a flowchart showing the compression processing according to an embodiment. The compression processing of the embodiment is basically performed by the processor 1211 mounted on the compression/decompression server 121. In steps S905 and S907, calculation efficiency is improved by executing part or all of the processing by the coprocessor 1212 mounted on the compression/decompression server 121.

The compression processing of the present embodiment is performed regularly. All compression queues are investigated, and if there is an image to be compressed stored in the compression queue, compression processing is performed. Here, the compression queue of the input shape fixed compressor is processed collectively after a fixed number of compression target images have been accumulated. The number of images to be compressed collectively differs depending on the shape of the image to be compressed. The number of images to be compressed collectively decreases as the shape of the image to be compressed becomes larger. The number of images to be compressed collectively also differs depending on hardware resources that perform compression processing. The compression queue is provided in the memory 1213 or the storage 1214.

First, in step S901, the processor 1211 sets a first compression queue among a plurality of ordered compression queues as a reference destination. Next, in step S902, the processor 1211 obtains information on the compression queue which is the current reference destination. In step S902, the processor 1211 obtains information on whether the compression queue is associated with an input shape fixed compressor or a general-purpose shape compressor and information on the number of compression target images stored in the compression queue.

Next, in step S903, the processor 1211 determines whether the compression queue for which information was obtained in step S902 is a compression queue associated with an input shape fixed compressor. The processor 1211 proceeds processing to step S904 when the compression queue is associated with an input shape fixed compressor (Yes in step S903). On the other hand, the processor 1211 proceeds processing to step S906 when the compression queue is associated with a general-purpose shape compressor (No in step S903).

In step S904, the processor 1211 determines whether the number of images stored in the compression queue is equal to or greater than a specified number for collectively executing compression processing by the input shape fixed compressor. The processor 1211 proceeds processing to step S905 when the number of images stored in the compression queue is greater than or equal to the specified number (Yes in step S904), and proceeds processing to step S908 when the number of images is less than the specified number (No in step S904).

In step S905, the processor 1211 and the coprocessor 1212 collectively performs compression processing on a specified number of compression target images with the input shape fixed compressor. Here, until the number of compression target images stored in the compression queue is less than the specified number for collectively performing compression processing, the process of collectively retrieving and compressing compression target images stored in the compression queue for a specified number of minutes is repeated.

In step S905, since processing of the input shape fixed compressor is efficiently executed by GPU or neural network dedicated hardware, compression processing performance in the system is improved.

In step S906, the processor 1211 checks whether the number of compression target images stored in the compression queue is 1 or more. The processor 1211 proceeds processing to step S907 when the number of compression target images stored in the compression queue is one or more (Yes in step S906), and proceeds processing to step S908 when the number of images is 0 (No in step S906).

In step S907, the coprocessor 1212 compresses the compression target images stored in the compression queue one by one with the general-purpose shape compressor. The operation of step S907 is repeated until there are no more compression target images in the compression queue.

In step S908, the processor 1211 determines whether there are compression target images is checked for all compression queues managed by the compression/decompression server 121. The processor 1211 ends compression processing when check of all compression queues is completed (Yes in step S908), and proceeds processing to step S909 when there are unchecked compression queues (No in step S908).

In step S909, the processor 1211 sets the compression queue ordered next to the compression queue set as the current reference destination among the compression queues managed by the compression/decompression server 121 as the next reference destination. When step S909 is finished, the processor 1211 returns processing to step S902.

(1-10) Update Processing of Input Shape Fixed Compressor

Figure 12:
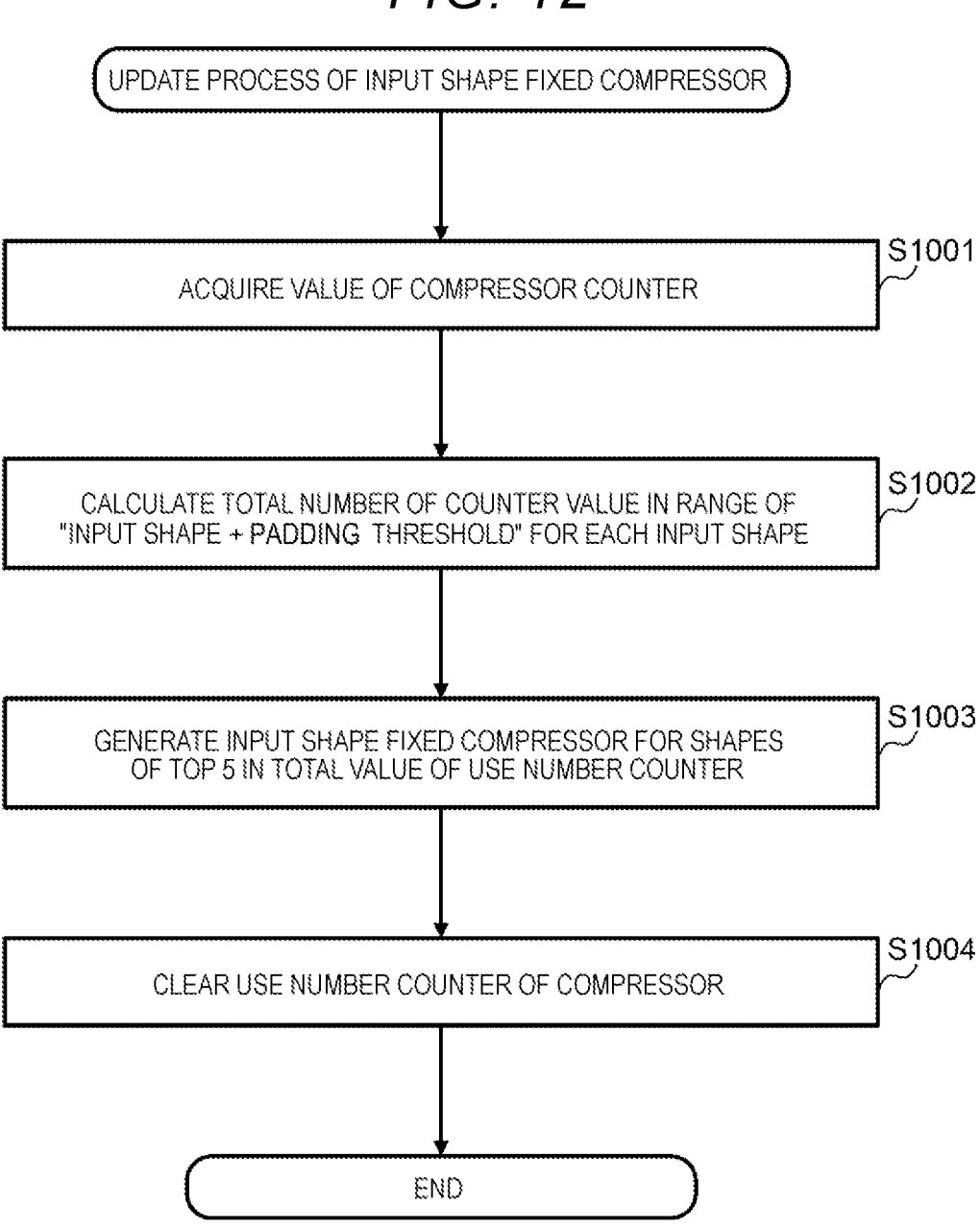
FIG. 12 is a flowchart showing update processing of the input shape fixed compressor according to an embodiment.

FIG. 12 is a flowchart showing update processing of an input shape fixed compressor according to an embodiment. In the present embodiment, five input shape fixed compressors are managed as compressors with relatively frequently used shapes. The shape of an image that is frequently used may change during the operation period of the system S, and the input shape fixed compressor is updated to follow the change. The processor 1211 mounted on the compression/decompression server 121 performs update processing of the input shape fixed compressor.

First, in step S1001, the processor 1211 obtains values of the compressor counts 705 of various shapes for compressors of all compression levels and compression types from the usage frequency management information 700 of the compressor/decompressor.

Next, in step S1002, the processor 1211 calculates, for each of all assumed shapes, the total value of the compressor counts 705 of all shapes within the range of vertically −32 and horizontally −32, which are padding thresholds, from the shape.

Next, in step S1003, the processor 1211 selects a compressor and a shape specified by a combination of compression levels and compression types that are in the top 5 based on the total value for each of all shapes calculated in step S1002. The processor 1211 generates an input shape fixed compressor specified by the corresponding compression level and compression type based on the general-purpose shape compressor. In step S1003, the old input shape fixed compressor is replaced by the new input shape fixed compressor generated here.

Next, in step S1004, the processor 1211 clears the usage counter for the number of compression times. More specifically, the processor 1211 sets the value of the compressor count 705 of the compressor/decompressor usage frequency management information 700 to 0. According to step S1004, past influences can be eliminated, and the frequency of use of each shape of the compressor during the period until the next processing can be measured.

In the present embodiment, it is assumed that the counter is completely cleared in step S1004, but it is not limited thereto. For example, the counter value may be halved, and the usage frequency may be counted for the period until the next processing while retaining some influence of the past usage frequency. It is not necessary to clear the counter in step S1004.

(1-11) Registration Processing to Decompression Queue

Figure 13:
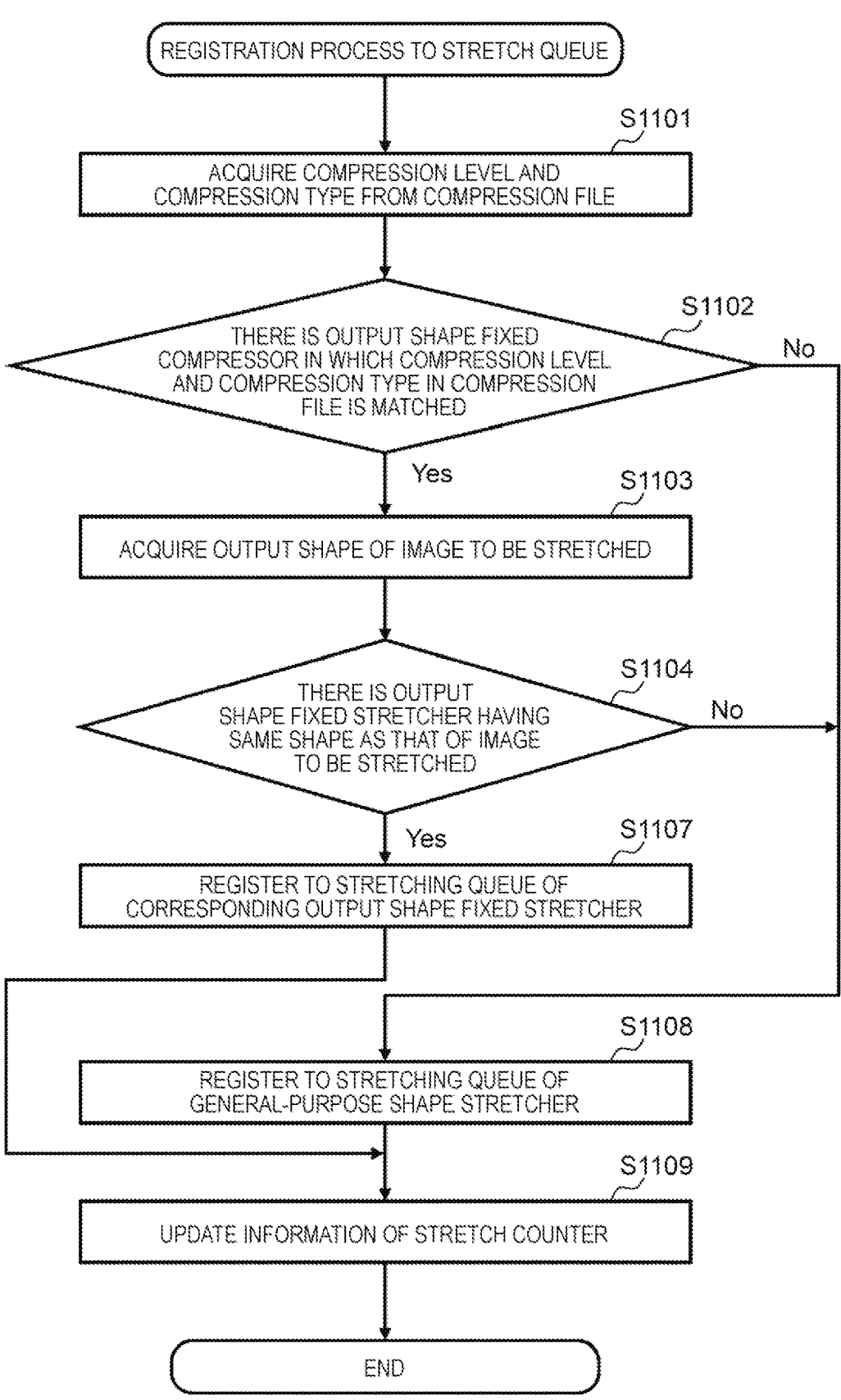
FIG. 13 is a flowchart showing registration processing to a decompression queue according to an embodiment.
Figure 14:
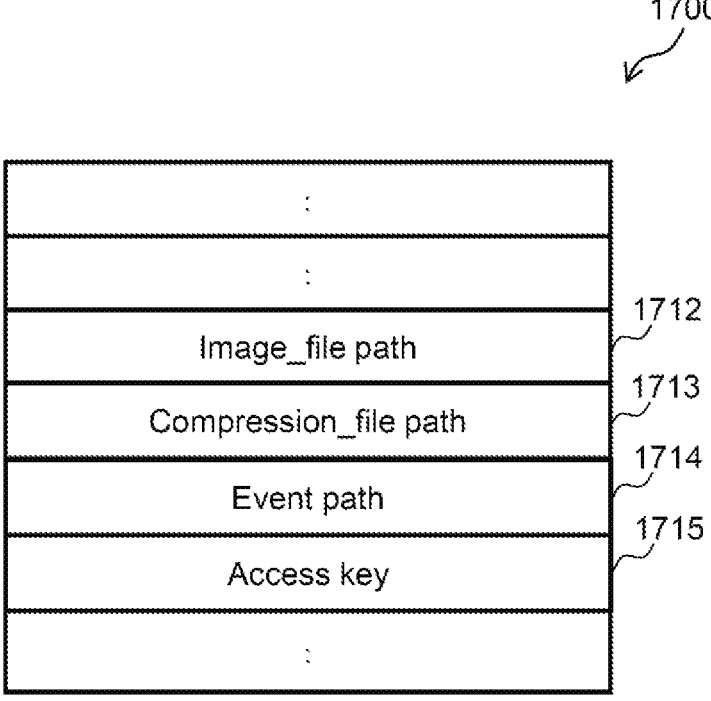
FIG. 14 is a diagram showing a configuration of a decompression request according to an embodiment.

FIG. 13 is a flowchart showing registration processing to a decompression queue according to an embodiment. The processor 1211 mounted on the compression/decompression server 121 performs registration processing to the decompression queue. FIG. 14 is a diagram showing a configuration of a decompression request 1700 according to an embodiment.

First, in step S1101, the processor 1211 obtains the compressed file from the compressed file path 1713 to be decompressed that is specified by the decompression request 1700 shown in FIG. 14 received from the user, and obtains the compression level and compression type stored in the compressed file. More specifically, the processor 1211 obtains the compression level and the compression type of the decompressor necessary to decompress the compressed data from the information in the compressor header information 612 in the compressed file 600.

The decompression request 1700 shown in FIG. 1 includes a file path 1712 in the storage service 1501 for storing images after decompression processing, a compression file path 1713 in the storage service 1501 for compressed files subject to decompression processing, an event path 1714 in the event service 1502 that notifies a completion event after completion of decompression processing, and an access key 1715 for the storage service 1501 acquiring an image to be decompressed or storing the compressed file after compression, but it is not necessary to include all the information shown in FIG. 14. The information included in the decompression request 1700 changes depending on the system configuration.

Next, in step S1102, the processor 1211 checks whether there is an output shape fixed decompressor that matches the compression level and the compression type obtained in step S1101 among the five output shape fixed decompressors managed by the compression/decompression server 121. The processor 1211 proceeds processing to step S1103 when there is an output shape fixed decompressor corresponding to the compression level and the compression type obtained in step S1101 among the five output shape fixed decompressor (Yes in step S1102). On the other hand, the processor 1211 proceeds processing to step S1108 when there is no output shape fixed decompressor corresponding to the compression level and the compression type obtained in step S1101 among the output shape fixed decompressor (No in step S1102).

In step S1103, the processor 1211 obtains the output shape of the decoding filter of the image to be decompressed. Specifically, the processor 1211 refers to information on the pre-compression image shape 610 and the padding shape 611 of the compressed file and obtains an output shape considering the padding of the decompression target image. The original shape of the decompression target image and the output shape considering padding may match, but when padding is applied, the shape of the decompression target image does not match the output shape.

Next, in step S1104, the processor 1211 checks whether there is an output shape fixed decompressor having the same output shape as the shape of the decompression target image obtained in step S1101. The processor 1211 proceeds processing to step S1107 when there is an output shape fixed decompressor with the same output shape as the shape of the decompression target image (Yes in step S1104). On the other hand, the processor 1211 proceeds processing to step S1108 when there is no output shape fixed decompressor with the same output shape as the shape of the decompression target image (No in step S1104).

In step S1107, the processor 1211 registers decompression target image data in the decompression queue of an output shape fixed decompressor with the same output shape as the shape of the decompression target image obtained in step S1101. The processor 1211 proceeds processing to step S1109 after registering the decompression target image data to the decompression queue.

Meanwhile, in step S1108, the processor 1211 registers decompression target image data that cannot be decompressed by any output shape fixed decompressor in the decompression queue of the general-purpose shape decompressor. When step S1108 is finished, the processor 1211 proceeds processing to step S1109.

In step S1109, the processor 1211 updates the decompressor count 706 of the compressor/decompressor usage frequency management information 700 (FIG. 8). Specifically, the processor 1211 increments the value of the decompressor count 706 corresponding to the output shape (shape with padding) of the decompression target image obtained in step S1103.

(1-12) Decompression Processing

Figure 15:
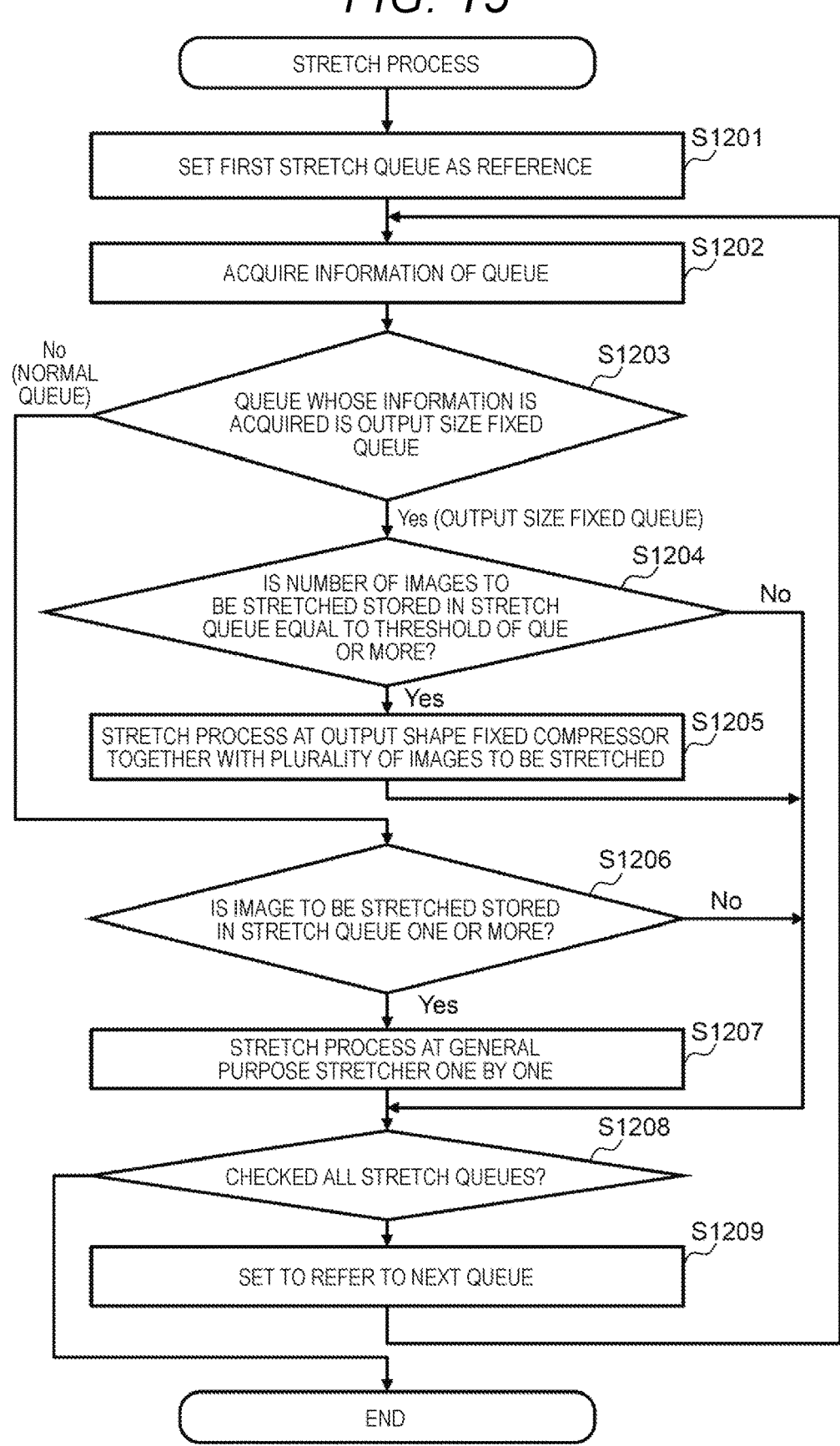
FIG. 15 is a flowchart t showing the decompression processing according to an embodiment.

FIG. 15 is a flowchart showing the decompression processing according to an embodiment. The compression processing of the present embodiment is basically performed by the processor 1211 mounted on the compression/decompression server 121. In steps S1205 and S1207, calculation efficiency is improved by executing part or all of the processing by the coprocessor 1212 mounted on the compression/decompression server 121.

The decompression processing of the present embodiment is performed regularly. All decompression queues are investigated, and if there is decompression target image data stored in the decompression queue, decompression processing is performed. Here, the decompression queue of the output shape fixed compressor is processed collectively after a fixed number of decompression target images have been accumulated. The number of decompression target images depends on the output shape of the decompression target image (the shape of the image plus the shape of the padding). The number of target images to be decompressed collectively decreases as the shape of the decompression target image becomes larger. The number of target images to be decompressed collectively also differs depending on hardware resources that perform decompression processing. The decompression queue is provided in the memory 1213 or the storage 1214.

First, in step S1201, the processor 1211 sets the first decompression queue among a plurality of ordered decompression queues as a reference destination. Next, in step S902, the processor 1211 obtains information on the compression queue which is the current reference destination. In step S1202, the processor 1211 obtains information on whether the decompression queue is associated with an output shape fixed decompressor or a general-purpose shape decompressor and information on the number of decompression target images stored in the decompression queue.

Next, in step S1203, the processor 1211 determines whether the decompression queue for which information was obtained in step S1202 is a decompression queue associated with an output shape fixed decompressor. The processor 1211 proceeds processing to step S1204 when the decompression queue is associated with an output shape fixed decompressor (Yes in step S1203). On the other hand, the processor 1211 proceeds processing to step S1206 when the decompression queue is associated with a general-purpose shape decompressor (No in step S1203).

In step S1204, the processor 1211 determines whether the number of images stored in the decompression queue is equal to or greater than a specified number for collectively executing decompression processing by the output shape fixed decompressor. The processor 1211 proceeds processing to step S1205 when the number of images stored in the decompression queue is greater than or equal the specified number (Yes in step S1204), and proceeds processing to step S1208 when the number of images is less than the specified number (No in step S1204).

In step S1205, the processor 1211 and the coprocessor 1212 collectively performs decompression processing on a specified number of decompression target images with the output shape fixed decompressor. Here, until the number of decompression target images stored in the decompression queue is less than the specified number for collectively performing decompression processing, the process of collectively retrieving and decompressing decompression target images stored in the decompression queue for a specified number of minutes is repeated. The processor 1211 and the coprocessor 1212 refer to the padding shape 611 included in the compressed file 600 and remove the padding area during compression from the decompressed data to generate a decompressed image.

In step S1205, since processing of the output shape fixed decompressor is efficiently executed by GPU or neural dedicated hardware, network decompression processing performance in the system is improved.

In step S1206, the processor 1211 checks whether the number of decompression target images stored in the decompression queue is 1 or more. The processor 1211 proceeds processing to step S1207 when the number of decompression target images stored in the decompression queue is one or more (Yes in step S1206), and proceeds processing to step S1208 when the number of images is 0 (No in step S1206).

In step S1207, the coprocessor 1212 decompresses the decompression target images stored in the decompression queue one by one with the general-purpose shape decompressor. The operation of step S1207 is repeated until there are no more decompression target images stored in the decompression queue. The padding shape 611 included in the compressed file 600 are referred to and the padding area during compression from the decompressed data is removed to generate a decompressed image. When step S1207 is finished, the processor 1211 proceeds processing to step S1208.

In step S1208, the processor 1211 determines whether there are decompression target images is checked for all decompression queues managed by the compression/decompression server 121. The processor 1211 ends decompression processing when check of all decompression queues is completed (Yes in step S1208), and proceeds processing to step S1209 when there are unchecked decompression queues (No in step S1208).

In step S1209, the processor 1211 sets the decompression queue ordered next to the decompression queue set as the current reference destination among the decompression queues managed by the compression/decompression server 121 as the next reference destination. When step S909 is finished, the processor 1211 returns processing to step S902.

(1-13) Update Processing for Output Shape Fixed Decompressor

Figure 16:
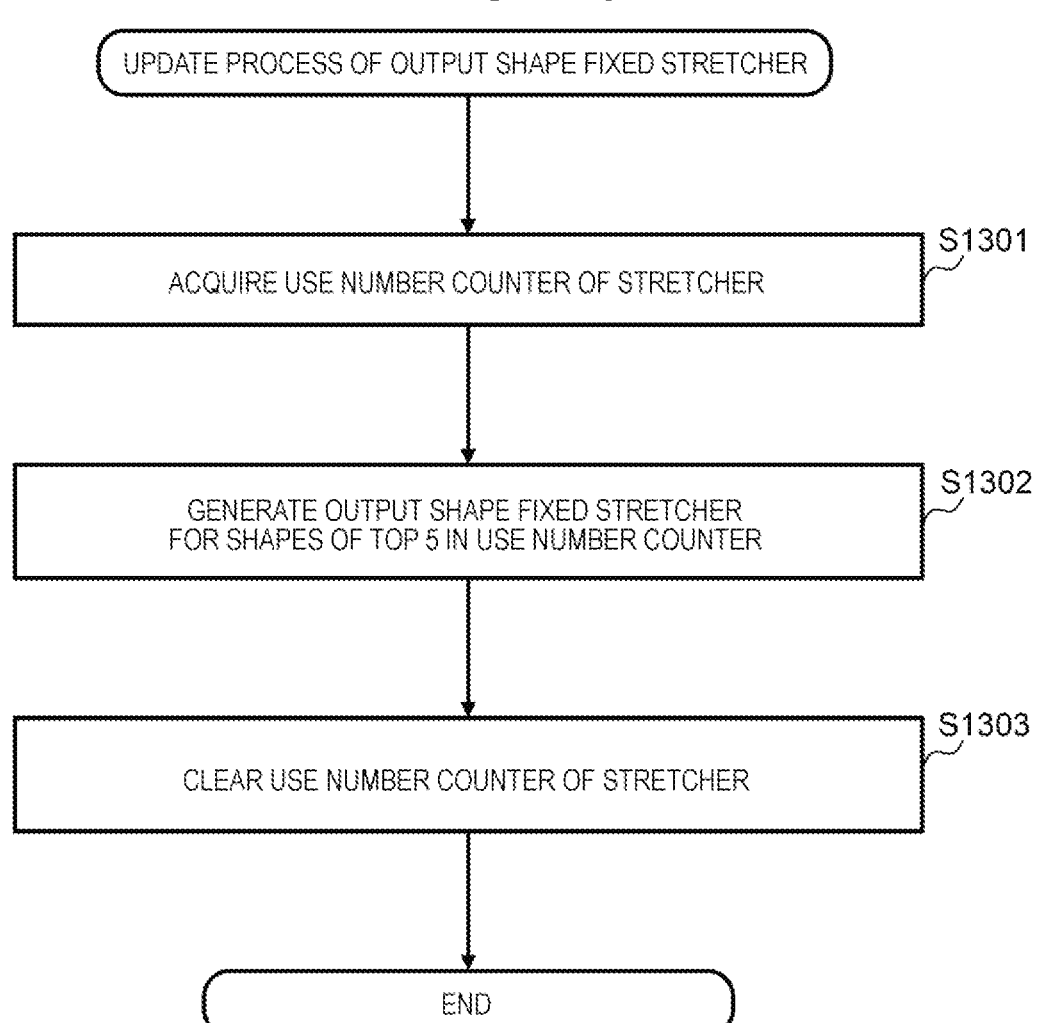
FIG. 16 is a flowchart showing the update processing of the output shape fixed decompressor according to an embodiment.

FIG. 16 is a flowchart showing update processing of an output shape fixed decompressor according to an embodiment. In the present embodiment, five output shape fixed decompressors are managed as decompressors with relatively frequently used shapes. The shape of an image that is frequently used may change during the operation period of the system S, and the output shape fixed decompressor is updated to follow the change. The processor 1211 mounted on the compression/decompression server 121 performs update processing of the output shape fixed decompressor.

First, in step S1301, the processor 1211 obtains values of decompressor counts 706 of various shapes for compressors of all compression levels and compression types from the usage frequency management information 700 of the compressor/decompressor.

Next, in step S1302, the processor 1211 selects a decompressor and a shape specified by a combination of compression levels and compression types that are in the top 5 based on the value of all decompressor count 706 obtained in step S1301. Then, the processor 1211 generates an output shape fixed decompressor specified by the corresponding compression level and compression type based on the general-purpose shape decompressor. In step S1302, the old output shape fixed decompressor is replaced by the new output shape fixed decompressor generated this time.

Next, in step S1303, the processor 1211 clears the usage counter for the number of decompression times. More specifically, the processor 1211 sets the value of the decompressor count 706 of the compressor/decompressor usage frequency management information 700 to 0. According to step S1303, past influences can be eliminated, and the frequency of use of each shape of the decompressor during the period until the next processing can be measured.

In the present embodiment, it is assumed that the counter is completely cleared in step S1303, but it is not limited thereto. For example, the counter value may be halved, and the usage frequency may be counted for the period until the next processing while retaining some influence of the past usage frequency. It is not necessary to clear the counter in step S1303.

(1-14) User Interface Screen

FIG. 17 is a diagram showing a user interface screen 1400 according to an embodiment. The user interface screen 1400 is an example of a graphical user interface screen for a user to perform settings.

The user interface screen 1400 in the present embodiment is a screen by the provided compression/decompression server 121 and displayed on a display unit of the user server 100 connected via the network 110. The user operates the user interface screen 1400, such that the user server 100 transfers commands to the compression/decompression server 121 to change various settings. The user interface screen 1400 is provided with input fields for an input shape fixed compressor management number 1401, an output shape fixed decompressor management number 1402, a maximum horizontal padding threshold value 1403, and a maximum vertical padding threshold value 1404.

The input shape fixed compressor management number 1401 is a field for inputting the maximum value of the number of management numbers of input shape fixed compressors managed by the compression/decompression server 121. The user can change the maximum value of the input shape fixed compressor via the interface.

The output shape fixed decompressor management number 1402 is a field for outputting the maximum value of the number of management numbers of output shape fixed decompressors managed by the compression/decompression server 121. The user can change the maximum value of the output shape fixed decompressor via the interface.

The maximum horizontal padding threshold value 1403 is a field for inputting the maximum value of the amount of horizontal padding performed in padding processing (step S806 (FIG. 9)). The maximum vertical padding threshold value 1404 is a field for inputting the maximum value of the amount of vertical padding performed in padding processing. By changing the amount of padding via the maximum horizontal padding threshold value 1403 and the maximum vertical padding threshold value 1404, the user can process a plurality of shapes with one input shape fixed compressor and output shape fixed decompressor. However, if the amount of padding is excessively increased, the time for image compression and decompression may increase due to an increase in processing for the padding area. In general, the amount of data reduction due to compression also decreases.

Effects of Embodiments

There are various image sizes, but when investigating the distribution of sizes in image groups, there is generally a large ratio of several specific sizes. Therefore, in a compression target image group composed of various sizes, a compression/decompressor using a neural net with a fixed input size optimized for inference of only sizes with a high presence ratio is created.

Then, images with a high presence ratio are processed using a compressor/decompressor using a neural net with a fixed input size. On the other hand, for images with a small presence ratio, when the size is slightly smaller than the input size of a neural net with a fixed input size that is already created, padding processing is performed and the padded image is processed using a compressor/decompressor using a neural network with a fixed input size. When the size is larger or considerably smaller than an already created neural network with a fixed input size, processing is performed with a compressor/decompressor configured with a neural network capable of inputting any size.

Thus, processing costs for compression/decompression processing can be reduced, and processing time for compression/decompression processing can be shortened. By reducing the cost of retaining image data, it is possible to handle a larger volume of data than the related art. By reducing the cost of retaining image data, it is also possible to store long-term storage of image data. Data transfer costs between clouds are reduced, and operation costs of systems across clouds can be reduced.

Processing to regenerate a compressor/decompressor using a neural net with a fixed input size optimized for inference only of sizes with a high presence ratio is repeatedly executed by prescribed triggers. Predetermined triggers include "periodically", "every compression or decompression process", "every hour", and "when the usage ratio of a fixed input size compressor/decompressor becomes lower than a certain level compared to that of a general size compressor/decompressor". Accordingly, it is possible to prevent a decrease in processing efficiency by maintaining the usage ratio of the compressor/decompressor decompressor for each size at a fixed level.

As described above, one embodiment of the present invention has been described in detail, but the present invention is not limited to the above embodiments, and various modification can be made within a range that does not deviate from its gist. For example, the embodiments described above are those described in detail to describe the present invention in an easy-to-understand manner, not necessarily limited to those having all the configurations described. It is possible to add, delete, or replace another configuration for a part of the configuration of each embodiment.

Each of the above components, functional parts, processing parts, processing means, and the like, may be implemented in hardware, for example, by designing the components in integrated circuits, in whole or in part. Each of the above components, functions, and the like may be implemented in software by a processor interpreting and executing a program that implements the respective functions. Information such as programs, tables, and files that implement each function can be stored in a recording device such as memory, hard disk, solid state drive (SSD), or a recording medium such as IC card, SD card, and DVD.

In each diagram above, control lines and information lines indicate what is considered necessary for description, and the lines do not necessarily indicate all control lines and information lines on implementation. For example, it may be considered that in reality almost all configurations are interconnected.

The arrangement form of each function of the user server 100, the user storage 101, and the compression/decompression server 121 described above is only one example. The arrangement form of each function of the user server 100, the user storage 101, and the compression/decompression server 121 can be changed to an optimal arrangement form from the viewpoint of hardware and software performance, processing efficiency, communication efficiency, and the like provided by each.

The structure of a database (schema or the like) for storing various types of data described above can be flexibly changed from the viewpoint of efficient use of resources, improved processing efficiency, improved access efficiency, and the like.

What is claimed is:

1. A data processing method executed by a data processing system including a processor that performs compression and/or decompression of image data, the processor executing steps comprising:

obtaining a shape of a tensor representing compression target data;

generating an input shape fixed compressor that outputs compressed data by executing compression processing using image data having a fixed input shape for each shape of the compression target data as input;

generating the compressed data by executing the compression processing of the compression target data using the generated input shape fixed compressor;

executing the compression processing of the compression target data using the input shape fixed compressor when there is an input shape fixed compressor corresponding to the input shape that matches the shape of the obtained compression target data; and executing the compression processing of the compression target data using the general-purpose shape compressor that outputs compression data by executing the compression processing using data having any of the input shapes as input if there is no input shape fixed compressor corresponding to the input shape that matches the shape of the obtained compression target data.

2. The data processing method according to claim 1, wherein the processor:

obtains a shape of a tensor representing image data before execution of the compression process of the decompression target data, generates an output shape fixed decompressor that performs decompression processing for outputting decompression data having an output shape fixed for each shape of the obtained decompression target data, and generates the decompression data by executing the decompression processing of the decompression target data using the generated output shape fixed decompressor.

3. The data processing method according to claim 2, wherein the processor:

executes the decompression processing of the decompression target data using the output shape fixed compressor when there is an output shape fixed compressor corresponding to the output shape that matches the shape of the obtained decompression target data, and executes the decompression processing of the decompression target data using a general-purpose shape decompressor that performs the decompression processing of data having any of the output shapes and outputs the decompression data when there is no output-fixed shape decompressor corresponding to the output shape that matches the shape of the obtained decompression target data.

4. The data processing method according to claim 3, wherein the processor:

counts frequency information on shapes of the compression target data and the decompression target data, based on the frequency information, generates an input shape fixed compressor for each shape of the compression target data and an output shape fixed decompressor for each shape of the decompression target data, and repeats regeneration of the input shape fixed compressor and the output shape fixed decompressor based on the frequency information at a specified trigger.

5. The data processing method according to claim 4, wherein the shape of the compression target data and the decompression target data includes vertical length and horizontal length of the compression target data and the decompression target data.

6. The data processing method according to claim 5, wherein the shape of the compression target data and the decompression target data includes color information of the compression target data and the decompression target data.

7. The data processing method according to claim 5, wherein the processor:

collectively executes the compression processing on the compression target data of a number corresponding to the shape of the compression target data, and collectively executes the decompression processing on the decompression target data of a number corresponding to the shape of the decompression target data.

8. The data processing method according to claim 5, wherein the processor:

applies padding to the compression target data, and a plurality of shapes of the compression target data are grouped into input shapes with high frequency in the frequency information, and executes the compression processing of the compression target data and the decompression processing of the decompression target data, using the input shape fixed compressor and the output shape fixed decompressor for each grouped input shape.

9. The data processing method according to claim 8, wherein the processor:

applies padding to the compression target data to match the input shape of the input shape fixed compressor and executes the compression processing of the padded compression target data using the input shape fixed compressor, when there is no input shape fixed compressor of the input shape that matches the shape of the obtained compression target data and when compared that the shape of the compression target data is smaller than the input shape of the input shape fixed compressor within a predetermined range, and executes the decompression processing of the decompression target data using the output shape fixed decompressor and generates the compression target data before compression by removing the padding from the decompressed data, when there is no output shape fixed decompressor of the output shape that matches the shape of the obtained decompression target data and when compared that the shape of the decompression target data is smaller than the output shape of the output shape fixed decompressor within a predetermined range.

10. The data processing method according to claim 9, wherein the compressed data holds information on the padding applied to the compression target data.

11. The data processing method according to claim 2, wherein the processor:

collectively executes the compression processing on a specified number of the compression target data for each shape of the compression target data, and collectively executes the decompression processing on a specified number of the decompression target data for each shape of the decompression target data.

12. The data processing method according to claim 2, wherein each of the input shape fixed compressor and the output shape fixed decompressor is a learning-based compressor and a learning-based decompressor generated by training a neural network.

13. A data processing system, comprising:

a processor for executing compression and/or decompression of image data, wherein the processor:

obtains a shape of a tensor representing compression target data, generates an input shape fixed compressor that outputs compressed data by executing compression processing using image data having a fixed input shape for each shape of the compression target data as input, and generates the compressed data by executing the compression processing of the compression target data using the generated input shape fixed compressor, executes the compression processing of the compression target data using the input shape fixed compressor when there is an input shape fixed compressor corresponding to the input shape that matches the shape of the obtained compression target data, and executes the compression processing of the compression target data using the general-purpose shape compressor that outputs compression data by executing the compression processing using data having any of the input shapes as input if there is no input shape fixed compressor corresponding to the input shape that matches the shape of the obtained compression target data.

14. The data processing system according to claim 13, wherein the processor:

obtains a shape of a tensor representing image data before execution of the compression process of the decompression target data, generates an output shape fixed decompressor that performs decompression processing for outputting decompression data having an output shape fixed for each shape of the obtained decompression target data, and generates the decompression data by executing the decompression processing of the decompression target data using the generated output shape fixed decompressor.

* * * * *